(12) United States Patent
Yao et al.

(10) Patent No.: US 12,337,279 B2
(45) Date of Patent: Jun. 24, 2025

(54) SYSTEM AND METHOD FOR COOPERATIVELY TREATING WATER AND GAS TO REDUCE POLLUTANTS AND CARBON EMISSION

(71) Applicant: BEIJING JIAOTONG UNIVERSITY, Beijing (CN)

(72) Inventors: Hong Yao, Beijing (CN); Jinyuan Ma, Beijing (CN); Sheng Tian, Beijing (CN); Xin Bao, Beijing (CN); Liru Fan, Beijing (CN); Anming Yang, Beijing (CN); Liang Zhang, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 422 days.

(21) Appl. No.: 17/821,192

(22) Filed: Aug. 22, 2022

(65) Prior Publication Data

US 2023/0211286 A1    Jul. 6, 2023

(30) Foreign Application Priority Data

Dec. 31, 2021   (CN) .......................... 202111674062.7

(51) Int. Cl.
   *B01D 53/75*    (2006.01)
   *B01D 53/34*    (2006.01)
   (Continued)

(52) U.S. Cl.
   CPC .......... *B01D 53/75* (2013.01); *B01D 53/343* (2013.01); *B01D 53/50* (2013.01); *C02F 9/00* (2013.01); *B01D 2257/302* (2013.01); *B01D 2258/0283* (2013.01); *C02F 1/04* (2013.01); *C02F 1/265* (2013.01); *C02F 3/28* (2013.01);
   (Continued)

(58) Field of Classification Search
   CPC ...... B01D 53/75; B01D 53/343; B01D 53/50; B01D 2257/302; B01D 2258/0283; B01D 53/56; B01D 53/62; B01D 2251/95; B01D 2257/404; B01D 2257/504; B01D 53/84; B01D 46/02; B01D 53/501; C02F 9/00; C02F 1/04; C02F 1/265; C02F 3/28; C02F 3/341; C02F 2101/16; C02F 2103/34; C02F 1/444; C02F 1/66; C02F 3/307; C02F 2103/18; C02F 2201/009; C02F 2303/10;
   (Continued)

(56) References Cited

U.S. PATENT DOCUMENTS

2016/0185619 A1*   6/2016   Ukai ..................... C02F 1/12
                                                           210/652

FOREIGN PATENT DOCUMENTS

CN       110894129   *  3/2020  ............ B01D 46/02
CN       112811710 A  *  5/2021

OTHER PUBLICATIONS

Espacenet Translation of CN 112811710 Obtained on Apr. 17, 2025 (Year: 2025).*

* cited by examiner

*Primary Examiner* — In Suk C Bullock
*Assistant Examiner* — Jessica M Whitman
(74) *Attorney, Agent, or Firm* — Chiesa Shahinian & Giantomasi PC

(57) ABSTRACT

A system and method for cooperatively treating water and gas to reduce pollutants and carbon emission. The system includes a flue gas pre-treatment unit, a wastewater pre-treatment unit, a gas-water cooperative cleaning unit, a remaining water treatment unit, and a circulating cooling evaporation unit.

9 Claims, 1 Drawing Sheet

(51) Int. Cl.
     *B01D 53/50*         (2006.01)
     *C02F 9/00*          (2023.01)
     *C02F 1/04*          (2023.01)
     *C02F 1/26*          (2023.01)
     *C02F 3/28*          (2023.01)
     *C02F 3/34*          (2023.01)
     *C02F 101/16*       (2006.01)
     *C02F 103/34*       (2006.01)

(52) U.S. Cl.
     CPC .......... *C02F 3/341* (2013.01); *C02F 2101/16* (2013.01); *C02F 2103/34* (2013.01)

(58) Field of Classification Search
     CPC ...... C02F 2303/22; Y02A 50/20; F25B 30/06; F28D 21/0001
     See application file for complete search history.

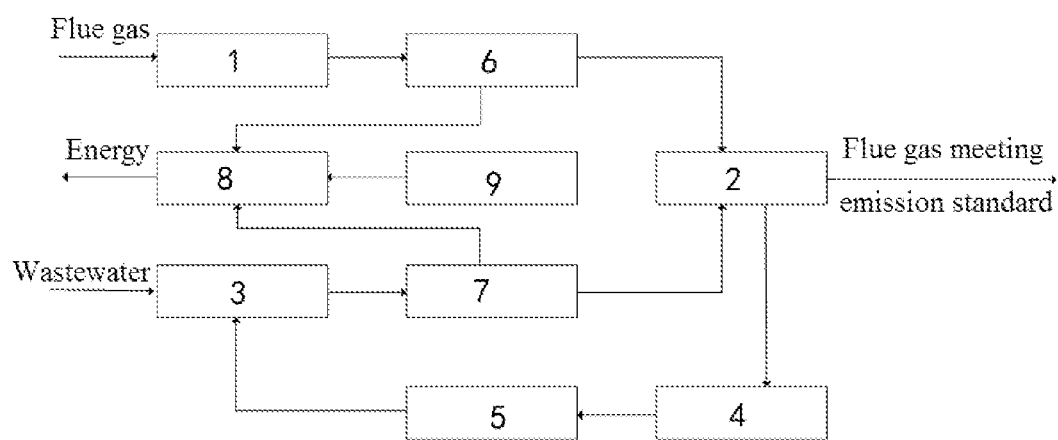

SYSTEM AND METHOD FOR COOPERATIVELY TREATING WATER AND GAS TO REDUCE POLLUTANTS AND CARBON EMISSION

CROSS REFERENCE TO RELATED APPLICATION

This patent application claims priority from Chinese Patent Application No. 202111674062.7, filed Dec. 31, 2021, the disclosure of which is incorporated by reference herein in its entirety as part of the present application.

FIELD

The present disclosure relates to the technical field of wastewater treatment, and in particular to a system and method for cooperatively treating water and gas to reduce pollutants and carbon emission.

BACKGROUND

The large amount of flue gas produced in industrial production is one of the culprits of global warming. Nitrogen oxide ($NO_X$), among which NO accounts for more than 90%, is one of the main pollutants in flue gas. At present, $NO_X$ is commonly removed by a selective non-catalytic reduction (SNCR) and a selective catalytic reduction (SCR). In the above methods, $NO_X$ is generally converted into $N_2$ at a temperature of above 300° C. in the presence of a metal catalyst and ammonia. However, the metal catalyst is costly, easily poisoned and prone to secondary pollution.

Although the emission of $CO_2$ is not prescribed in the current China flue gas emission standards, $CO_2$ is the most important substance that causes climate change, and accounts for more than 10% of flue gas. Therefore, it is also necessary to control the emission of $CO_2$ in flue gas.

A large amount of wastewater produced in industrial production is one of the main sources of water pollution, and ammonia nitrogen ($NH_4^+$—N) and organics contained therein are the main pollutants. Systems are required to treat wastewater to reduce the concentration of $NH_4^+$—N and organics before discharging. Organics in wastewater are a carbon source, which once recycled could be used for energy generation, to make up for the energy consumption of the systems. Wastewater is commonly denitrified by the technology of nitrification and denitrification. However, currently, during the process of $NH_4^+$—N removal, the carbon source is converted into $CO_2$ and then discharged, which wastes the carbon source in the wastewater and causes carbon emission. Moreover, the current systems involve multiple steps of oxidation-reduction reactions, has a high cost of denitrification and is a long process, and is costly and inconvenient.

SUMMARY

In view of the above, an object of the present disclosure is to provide a system and method for cooperatively treating water and gas to reduce pollutants and carbon emission. By using the system for cooperatively treating water and gas to reduce pollutants and carbon emission according to the present disclosure, both $NO_X$ and $CO_2$ in flue gas, and $NH_4^+$—N and organics in wastewater could be removed.

In order to achieve the above object, the present disclosure provides the following technical solutions:

The present disclosure provides a system for cooperatively treating water and gas to reduce pollutants and carbon emission, comprising:

a flue gas pre-treatment unit 1, which comprises a desulphurization device and a dust removal device, a gas-water cooperative cleaning unit 2, which has an inlet connecting with an outlet of the flue gas pre-treatment unit 1, and includes an anammox microorganism therein, and is provided with a gas outlet, a water inlet, and a water outlet, a wastewater pre-treatment unit 3, which is provided with a carbon source separation device, and is provided with a carbon source outlet, and a water outlet that is connected with the water inlet of the gas-water cooperative cleaning unit 2, a remaining water treatment unit 4, which has an inlet connecting with the water outlet of the gas-water cooperative cleaning unit 2, and includes a desalting device, and a circulating cooling evaporation unit 5, which has an inlet connecting with an outlet of the remaining water treatment unit 4, and a residual water outlet that is connected with an inlet of the wastewater pre-treatment unit 3.

In some embodiments, the outlet of the flue gas pre-treatment unit 1 is connected to the gas-water cooperative cleaning unit 2 through a first pipeline, wherein the first pipeline is provided with a first heat recovery device 6 thereon, and the first heat recovery device 6 is provided with a first heat outlet, the water outlet of the wastewater pre-treatment unit 3 is connected with the water inlet of the gas-water cooperative cleaning unit 2 through a second pipeline, wherein the second pipeline is provided with a second heat recovery device 7, and the second heat recovery device 7 is provided with a second heat outlet, and the first heat outlet and the second heat outlet are connected to an energy recovery unit 8, respectively.

In some embodiments, the system further comprises a clean energy generation unit 9, wherein the clean energy generation unit 9 comprises at least one selected from the group consisting of a solar power generation device and a carbon-source hydrogen generation device, and the carbon-source hydrogen generation device has an inlet connecting to the carbon source outlet of the wastewater pre-treatment unit 3, and the clean energy generation unit 9 is provided with an energy outlet connected to an inlet of the energy recovery unit 8.

In some embodiments, the first heat recovery device 6 is an air-source heat pump, and the second heat recovery device 7 is a heat exchanger.

In some embodiments, the gas-water cooperative cleaning unit 2 is an anammox reactor.

In some embodiments, the carbon source separation device is provided with a carbon source separation membrane inside.

The present disclosure further provides a method for cooperatively treating water and gas based on the system as described in the above technical solutions, comprising steps of introducing flue gas into the flue gas pre-treatment unit 1, and subjecting the flue gas to a desulphurization and dust removal treatment to obtain a desulphurized and dust-removed flue gas, and introducing the desulphurized and dust-removed flue gas into the gas-water cooperative cleaning unit 2, introducing wastewater into the wastewater pre-treatment unit 3, and subjecting the wastewater to a carbon source separation, adjusting a pH value of the wastewater after the carbon source separation to 7.0-8.2 to obtain a carbon source-removed wastewater, and introducing the carbon source-removed wastewater into the gas-water cooperative cleaning unit 2, and subjecting the carbon source-removed wastewater to a water-gas cooperative treatment together with the desulphurized and dust-removed flue gas, to obtain a clean flue gas and remaining water, introducing the remaining water into the remaining water treatment unit 4, and subjecting the remaining water to a desalting treatment to obtain a desalted water, and introducing the desalted water into the circulating cooling evaporation unit 5, subjecting the desalted water to a circulating cooling evaporation as a cooling water to obtain a residual water, and introducing the residual water into the wastewater pre-treatment unit 3.

In some embodiments, a volume flow ratio of the desulphurized and dust-removed flue gas introduced into the gas-water cooperative cleaning unit 2 to the carbon source-removed wastewater introduced into the gas-water cooperative cleaning unit is in a range of 2:1 to 10:1.

In some embodiments, the desulphurized and dust-removed flue gas has a sulfur oxides ($SO_X$) concentration of not greater than 200 mg/$Nm^3$, and a dust concentration of not greater than 20 mg/$Nm^3$, and the carbon source-removed wastewater has an $NH_4^+$—N concentration of 30-500 mg/L, and a ratio value of chemical oxygen demand (COD) to the $NH_4^+$—N concentration is not greater than 1.

In some embodiments, the method further comprises:

before introducing into the gas-water cooperative cleaning unit 2, first introducing the desulphurized and dust-removed flue gas into the first heat recovery device 6, and recovering heat from the desulphurized and dust-removed flue gas to obtain a first recovered heat and a desulphurized and dust-removed flue gas after recovering heat, and before introducing into the gas-water cooperative cleaning unit, first introducing the carbon source-removed wastewater into the second heat recovery device 7, recovering heat from the carbon source-removed wastewater to obtain a second recovered heat and a carbon source-removed wastewater after recovering heat, and introducing the first recovered heat and second recovered heat into an energy recovery unit 8 for an energy recovery.

The present disclosure provides a system for cooperatively treating water and gas to reduce pollutants and carbon emission, comprising a flue gas pre-treatment unit 1, a wastewater pre-treatment unit 3, a gas-water cooperative cleaning unit 2, a remaining water treatment unit 4, and a circulating cooling evaporation unit 5. In the present disclosure, flue gas is introduced into the flue gas pre-treatment unit 1, and subjected to a desulphurization and dust removal to obtain a desulphurized and dust-removed flue gas, which contains $NO_X$ and $CO_2$; wastewater is introduced into the wastewater pre-treatment unit 3, and subjected to a carbon source separation to obtain a carbon source-removed wastewater, which contains $NH_4^+$—N; the desulphurized and dust-removed flue gas and the carbon source-removed wastewater are simultaneously introduced into the gas-water cooperative cleaning unit 2, and subjected to a cooperative treatment, during which in the presence of an anammox microorganism, and with $CO_2$ as a carbon source and $NO_X$ as an electron acceptor, $NH_4^+$—N in the wastewater is converted into $N_2$, and $CO_2$ is converted into a biomass and then fixed in a remaining water obtained after the cooperative treatment, and the remaining water is subjected to a desalting treatment and a circulating cooling evaporation as a cooling water to obtain a residual water, and the residual water is recycled to the wastewater pre-treatment unit 3 and then subjected to a carbon source separation. Therefore, by using the system for cooperatively treating water and gas to reduce pollutants and carbon emission, $NO_X$ and $CO_2$ in flue gas and $NH_4^+$—N and organics in wastewater could be simultaneously removed, thus realizing standard-met discharge of the flue gas and near zero discharge of wastewater, solving problems of high cost, complicated process, secondary pollution, and low efficiency of carbon reduction present in separation and treatment of waste gas and wastewater of conventional industrial enterprises.

In some embodiments, the system for cooperatively treating water and gas to reduce pollutants and carbon emission according to the present disclosure further comprises a first heat recovery device 6, a second heat recovery device 7, and an energy recovery unit 8. In the present disclosure, the heat of the flue gas and wastewater is recovered, and the recovered energy may be used to make up for the energy consumption of the system.

In some embodiments, the system for cooperatively treating water and gas to reduce pollutants and carbon emission according to the present disclosure further comprises a clean energy generation unit 9, and the clean energy generation unit 9 could convert light energy to electric energy or convert a carbon source discharged from the wastewater pre-treatment unit 3 to hydrogen energy; the obtained electric energy or hydrogen energy is introduced into an energy recovery unit 8 and recovered to obtain recovered energy, and the recovered energy may be used to offset the energy consumption of the system.

BRIEF DESCRIPTION OF THE DRAWINGS

FIG. 1 shows a schematic diagram of a system for cooperatively treating water and gas to reduce pollutants and carbon emission according to one embodiment of the present disclosure, wherein 1 represents a flue gas pre-treatment unit, 2 represents a gas-water cooperative cleaning unit, 3 represents a wastewater pre-treatment unit, 4 represents a remaining water treatment unit, 5 represents a circulating cooling evaporation unit, 6 represents a first heat recovery device, 7 represents a second heat recovery device, 8 represents an energy recovery unit, and 9 represents a clean energy generation unit.

DETAILED DESCRIPTION

The present disclosure provides a system for cooperatively treating water and gas to reduce pollutants and carbon emission, comprising:

a flue gas pre-treatment unit 1, which comprises a desulphurization device and a dust removal device, a gas-water cooperative cleaning unit 2, which has an inlet connecting with the flue gas pre-treatment unit 1, includes an anammox microorganism therein, and is provided with a gas outlet, a water inlet, and a water outlet, a wastewater pre-treatment unit 3, which is provided with a carbon source separation device inside, and is provided with a carbon source outlet, and a water outlet that is connected to the water inlet of the gas-water cooperative cleaning unit 2, a remaining water treatment unit 4, which has an inlet connecting with the water outlet of the gas-water cooperative cleaning unit 2, and includes a desalting device inside, and a circulating cooling evaporation unit 5, which has an inlet connecting with an outlet of the remaining water treatment unit 4, and a residual water outlet connected to an inlet of the wastewater pre-treatment unit 3.

In the present disclosure, the system for cooperatively treating water and gas to reduce pollutants and carbon emission according to the present disclosure comprises a flue gas pre-treatment unit 1. In the present disclosure, the flue gas pre-treatment unit 1 comprises a desulphurization device and a dust removal device. In the present disclosure, there is no special limitation on the specific types of the desulphurization device and dust removal device, and any desulphurization device and dust removal device well known to those skilled in the art may be used. In some embodiments, the desulphurization device is an alkali desulfurization tower. In some embodiments, the dust removal device is selected from the group consisting of a bag filter and an electrostatic precipitator. In some embodiments, the desulphurization device is set in front of the dust removal device.

In the present disclosure, the system for cooperatively treating water and gas to reduce pollutants and carbon emission according to the present disclosure comprises a gas-water cooperative cleaning unit 2 that has an inlet connected to the flue gas pre-treatment unit 1, wherein the gas-water cooperative cleaning unit 2 includes an anammox microorganism therein, and is provided with a gas outlet, a water inlet, and a water outlet.

In some embodiments, the gas-water cooperative cleaning unit 2 is an anammox reactor, and the anammox reactor is provided with an anammox microorganism therein. In the present disclosure, there is no special limitation on the specific types of the anammox microorganism, and any anammox microorganism well known to those skilled in the art may be used. In some embodiments, the anammox microorganism is present as a form of biofilm, flocculent sludge, or granular sludge.

In some embodiments, the anammox reactor is provided with a gas inlet at the bottom. In some embodiments, flue gas is introduced into the reactor from the bottom in a form of microbubbles. During full contact of the microbubbles with the anammox microorganism, $CO_2$ in the flue gas is captured and converted into a biomass, and $NO_X$ is captured and converted with $NH_4^+$—N in wastewater into $N_2$. The flue gas and wastewater are continuously introduced into the reactor, treated and discharged, thus realizing continuous clean flue gas and wastewater.

In the present disclosure, the system for cooperatively treating water and gas to reduce pollutants and carbon emission according to the present disclosure comprises a wastewater pre-treatment unit 3, wherein the wastewater pre-treatment unit 3 is provided with a carbon source separation device inside, and is provided with a carbon source outlet, and a water outlet is connected to the water inlet of the gas-water cooperative cleaning unit 2. In some embodiments, the carbon source separation device is provided with a carbon source separation membrane inside. In some embodiments, COD in wastewater is separated from the wastewater by the carbon source separation membrane. In some embodiments, the carbon source separation membrane is selected from a fiber separation membrane and a ceramic separation membrane. In some embodiments, the carbon source separation membrane has a pore diameter of 0.05-5 µm, and preferably 0.5-3 µm.

In the present disclosure, the system for cooperatively treating water and gas to reduce pollutants and carbon emission according to the present disclosure comprises a remaining water treatment unit 4 that has an inlet connecting with the water outlet of the gas-water cooperative cleaning unit 2, wherein the remaining water treatment unit 4 includes a desalting device inside. In some embodiments, the desalting device is provided with a dosing device. In some embodiments, the dosing device is loaded with a detergent. In the present disclosure, there is no special limitation on the types of the detergent, and any detergent well known to those skilled in the art may be used. In the present disclosure, salts in the wastewater are removed by the desalting device, thus reducing the scaling and corrosion capacity of the wastewater.

In the present disclosure, the system for cooperatively treating water and gas to reduce pollutants and carbon emission according to the present disclosure comprises a circulating cooling evaporation unit 5 that has an inlet connecting with an outlet of the remaining water treatment unit 4, wherein the circulating cooling evaporation unit 5 is provided with a residual water outlet that is connected to an inlet of the wastewater pre-treatment unit 3. In some embodiments, the circulating cooling evaporation unit 5 is a cooling water tower. In the present disclosure, the circulating cooling evaporation unit 5 could evaporate the water generated from the remaining water treatment unit 4, and the resulting residual water is introduced into the wastewater pre-treatment unit 3 and continuously treated, thus realizing near zero discharge of wastewater.

In some embodiments, the flue gas pre-treatment unit 1 has an outlet connected to the gas-water cooperative cleaning unit 2 through a first pipeline, wherein the first pipeline is provided with a first heat recovery device 6 thereon, and the first heat recovery device 6 is provided with a first heat outlet, the water outlet of the wastewater pre-treatment unit 3 is connected to the gas-water cooperative cleaning unit 2 through a second pipeline, wherein the second pipeline is provided with a second heat recovery device 7, and the second heat recovery device 7 is provided with a second heat outlet, and the first heat outlet and the second heat outlet is connected to an energy recovery unit 8, respectively.

In some embodiments, the first heat recovery device 6 is an air-source heat pump, and the second heat recovery device 7 is a heat exchanger.

In some embodiments, the energy recovery unit 8 is a heat-electricity co-generation device.

In some embodiments, the first heat recovery device 6, second heat recovery device 7, and energy recovery unit 8 are used to recover heat from the flue gas and wastewater, and the recovered heat is used to offset the energy consumption of the system.

In some embodiments, the system for cooperatively treating water and gas to reduce pollutants and carbon emission according to the present disclosure further comprises a clean energy generation unit 9, the clean energy generation unit 9 comprises at least one selected from the group consisting of a solar power generation device and a carbon-source hydrogen generation device, wherein the carbon-source hydrogen generation device has an inlet connected to the carbon source outlet of the wastewater pre-treatment unit 3, and The clean energy generation unit 9 is provided with an energy outlet connected to an inlet of the energy recovery unit 8.

In some embodiments, the solar power generation device is a photovoltaic panel, and the carbon-source hydrogen generation device is an electrolytic hydrogen production device.

In some embodiments, the clean energy generation unit 9 could convert light energy into electric energy or convert the carbon source discharged from the wastewater pre-treatment unit 3 to hydrogen energy, the electric energy or hydrogen energy is introduced into the energy recovery unit 8 and recovered, and the recovered energy is used to offset the energy consumption of the system.

FIG. 1 shows a schematic diagram of a system for cooperatively treating water and gas to reduce pollutants and carbon emission according to the present disclosure, wherein 1 represents a flue gas pre-treatment unit, 2 represents a gas-water cooperative cleaning unit, 3 represents a wastewater pre-treatment unit, 4 represents a remaining water treatment unit, 5 represents a circulating cooling evaporation unit, 6 represents a first heat recovery device, 7 represents a second heat recovery device, 8 represents an energy recovery unit, and 9 represents a clean energy generation unit.

The present disclosure further provides a method for cooperatively treating water and gas based on the system as described in the above technical solutions, comprising steps of introducing flue gas into the flue gas pre-treatment unit 1, and subjecting the flue gas to a desulphurization and dust removal treatment to obtain a desulphurized and dust-removed flue gas, and introducing the desulphurized and dust-removed flue gas into the gas-water cooperative cleaning unit 2, introducing wastewater into the wastewater pre-treatment unit 3, and subjecting the wastewater to a carbon source separation, adjusting a pH value of the wastewater after the carbon source separation to 7.0-8.2, to obtain a carbon source-removed wastewater, and introducing the carbon source-removed wastewater into the gas-water cooperative cleaning unit 2, and subjecting the carbon source-removed wastewater to a water-gas cooperative treatment together with the desulphurized and dust-removed flue gas, to obtain a clean flue gas and a remaining water, introducing the remaining water into the remaining water treatment unit 4, and subjecting the remaining water to a desalting treatment to obtain a desalted water, and introducing the desalted water into the circulating cooling evaporation unit 5, subjecting the desalted water to a circulating cooling evaporation as a cooling water to obtain a residual water, and introducing the residual water into the wastewater pre-treatment unit 3.

In the present disclosure, flue gas is introduced into the flue gas pre-treatment unit 1 and subjected to a desulphurization and dust removal treatment to obtain a desulphurized and dust-removed flue gas, and the desulphurized and dust-removed flue gas is introduced into the gas-water cooperative cleaning unit 2. In some embodiments, the flue gas is produced from an industrial enterprise, and contains $NO_X$ and $CO_2$. In some embodiments, the flue gas comprises the following components: in percentage by volume, 200-1,000 ppm of NO, 1,500-2,500 ppm of $SO_2$, 3-5% of $O_2$, 8-12% of $CO_2$, 78-79% of $N_2$.

In some embodiments, the desulphurized and dust-removed flue gas has an $SO_X$ concentration of not greater than 200 mg/Nm³, preferably 50-150 mg/Nm³, and a dust concentration of not greater than 20 mg/Nm³.

In the present disclosure, wastewater is introduced into the wastewater pre-treatment unit 3, and subjected to a carbon source separation, and a pH value of the wastewater after the carbon source separation is adjusted to 7.0-8.2, preferably 7.5-8.0, to obtain a carbon source-removed wastewater, and the carbon source-removed wastewater is introduced into the gas-water cooperative cleaning unit 2, and subjected to a water-gas cooperative treatment together with the desulphurized and dust-removed flue gas, to obtain a clean flue gas and a remaining water. In some embodiments, the carbon source separation is performed by separating with a carbon source separation membrane. In some embodiments, the carbon source-removed wastewater has an $NH_4^+$—N concentration of 30-500 mg/L, preferably 50-200 mg/L, and a ratio value of COD to the $NH_4^+$—N concentration is not greater than 1.

In some embodiments, a volume flow ratio of the desulphurized and dust-removed flue gas introduced into the gas-water cooperative cleaning unit 2 to the carbon source-removed wastewater introduced into the gas-water cooperative cleaning unit 2 is in a range of 2:1 to 10:1, preferably 5:1 to 8:1.

In the present disclosure, during the water-gas cooperative treatment, in the presence of an anammox microorganism, $CO_2$ in the desulphurized and dust-removed flue gas is captured and converted into a biomass, and $NO_X$ is captured and converted with $NH_4^+$—N in wastewater into $N_2$. The flue gas and wastewater are continuously introduced into the reactor, treated and discharged, thus realizing continuous cleaning of the flue gas and wastewater.

In the present disclosure, the clean flue gas obtained after the water-gas cooperative treatment meets emission standards and could be directly discharged.

In the present disclosure, the remaining water is introduced into the remaining water treatment unit 4, and subjected to a desalting treatment to obtain a desalted water. In some embodiments, the desalting treatment is performed by using a detergent.

In the present disclosure, the desalted water is introduced into the circulating cooling evaporation unit 5, and subjected to a circulating cooling evaporation as a cooling water to obtain a residual water, and the residual water is introduced into the wastewater pre-treatment unit 3. In some embodiments, the circulating cooling evaporation is performed in a cooling water tower.

In some embodiments, the method further comprises:

before introducing into the gas-water cooperative cleaning unit 2, introducing the desulphurized and dust-removed flue gas into a first heat recovery device 6, and recovering heat from the desulphurized and dust-removed flue gas to obtain a first recovered heat and a desulphurized and dust-removed flue gas after recovering heat, and before introducing into the gas-water cooperative cleaning unit 2, introducing the carbon source-removed wastewater into a second heat recovery device 7, recovering heat from the carbon source-removed wastewater to obtain a second recovered heat and a carbon source-removed wastewater after recovering heat, and introducing the first recovered heat and second recovered heat into an energy recovery unit 8 for an energy recovery.

In some embodiments, the desulphurized and dust-removed flue gas after recovering heat has a temperature of 20-50° C., and preferably 30-40° C. In some embodiments, the carbon source-removed wastewater after recovering heat has a temperature of 15-35° C., and preferably 20-30° C.

The system and method for cooperatively treating water and gas to reduce pollutants and carbon emission according to the present disclosure will be described in detail in conjunction with examples, but the examples shall not be interpreted as limitation on the scope of the present disclosure.

Example 1

An industrial flue gas and an industrial wastewater were treated by using the system for cooperatively treating water and gas to reduce pollutants and carbon emission according to the present disclosure, and the treatment method was performed by the following steps:

The flue gas was introduced into the flue gas pre-treatment unit 1, and subjected to a desulphurization and dust removal treatment therein, obtaining a desulphurized and dust-removed flue gas. The desulphurized and dust-removed flue gas was introduced into an air-source heat pump and subjected to a heat recovery, and then introduced into the gas-water cooperative cleaning unit 2.

The wastewater was introduced into the wastewater pre-treatment unit 3, and subjected to a carbon source separation therein. A pH value of the wastewater after the carbon source separation was adjusted to 7.5, obtaining a carbon source-removed wastewater. The carbon source-removed wastewater was introduced into a heat exchanger and subjected to a heat recovery, then introduced into the gas-water cooperative cleaning unit 2, and subjected to a water-gas cooperative treatment together with the desulphurized and dust-removed flue gas therein, obtaining a clean flue gas and a remaining water.

The remaining water was introduced into the remaining water treatment unit 4, and subjected to a desalting treatment therein, obtaining a desalted water.

The desalted water was introduced into the circulating cooling evaporation unit 5, and subjected to a circulating cooling evaporation therein as a cooling water, obtaining a residual water, and the residual water was introduced into the wastewater pre-treatment unit 3.

Index parameters of the flue gas and water in each step were shown in table 1.

TABLE 1

Index parameters of the flue gas and water in each step of Example 1.

| Index parameters of the flue gas | $SO_2$ (mg/m$^3$) | Dust (mg/m$^3$) | $NO_x$ (mg/m$^3$) | $CO_2$ |
|---|---|---|---|---|
| Original flue gas | 2,500 | 20,000 | 300 | 12% |
| Flue gas after the desulphurization and dust removal | <100 | <200 | 280 | 10% |
| Flue gas after the water-gas cooperative treatment | <50 | <20 | <50 | <8% |

| Index parameters of water | COD (mg/L) | $NH_4^+$—N (mg/L) | Soluble salts (mg/L) |
|---|---|---|---|
| Original wastewater | 500 | 60 | Calcium hardness >1,000<br>Total Fe >20<br>$Cu^{2+}$ >20<br>$Cl^-$ >1,000 |
| Wastewater after the carbon source separation | <100 | <60 | Calcium hardness >1,000<br>Total Fe >20<br>$Cu^{2+}$ >20<br>$Cl^-$ >1000 |
| Wastewater after the water-gas cooperative treatment | <50 | <10 | Calcium hardness >500<br>Total Fe >15<br>$Cu^{2+}$ >15<br>$Cl^-$ >1,000 |
| Wastewater after the desalting treatment | <50 | <10 | Calcium hardness <200<br>Total Fe <2<br>$Cu^{2+}$ <0.1<br>$Cl^-$ <500 |
| Final discharged water | <50 | <5 | Calcium hardness <200<br>Total Fe <2<br>$Cu^{2+}$ <0.1<br>$Cl^-$ <500 |

Example 2

An industrial flue gas and an industrial wastewater were treated by using the system for cooperatively treating water and gas to reduce pollutants and carbon emission according to the present disclosure, and the treatment method was performed by the following steps:

The flue gas was introduced into the flue gas pre-treatment unit 1, and subjected to a desulphurization and dust removal treatment therein, obtaining a desulphurized and dust-removed flue gas. The desulphurized and dust-removed flue gas was introduced into an air-source heat pump and subjected to a heat recovery, and then introduced into the gas-water cooperative cleaning unit 2.

The wastewater was introduced into the wastewater pre-treatment unit 3, subjected to a carbon source separation therein. A pH value of the wastewater after the carbon source separation was adjusted to 7.5, obtaining a carbon source-removed wastewater. The carbon source-removed wastewater was introduced into a heat exchanger and subjected to a heat recovery, then introduced into the gas-water cooperative cleaning unit 2, and subjected to a water-gas cooperative treatment together with the desulphurized and dust-removed flue gas, obtaining a clean flue gas and a remaining water. A carbon source discharged from the carbon source separation unit 3 was introduced into a carbon-source hydrogen generation device, and subjected to a hydrogen generation process therein, obtaining hydrogen energy. The hydrogen energy was introduced into an energy recovery unit 8 and subjected to an energy recovery.

The remaining water was introduced into the remaining water treatment unit 4, and subjected to a desalting treatment, obtaining a desalted water.

The desalted water was introduced into the circulating cooling evaporation unit 5, and subjected to a circulating cooling evaporation therein as a cooling water, obtaining a residual water. The residual water was introduced into the wastewater pre-treatment unit 3.

Heat recovered by the air-source heat pump and heat exchanger was introduced into the energy recovery unit 8 and subjected to an energy recovery.

Electric energy generated by a solar power generation device was introduced into the energy recovery unit 8 and subjected to an energy recovery. All the recovered energy was used to offset the energy consumption of the system.

Index parameters of the flue gas and water in each step were shown in table 2.

TABLE 2

Index parameters of the flue gas and water in each step of Example 2.

| Index parameters of the flue gas | $SO_2$ (mg/m$^3$) | Dust (mg/m$^3$) | $NO_x$ (mg/m$^3$) | $CO_2$ |
|---|---|---|---|---|
| Original flue gas | 1,500 | 10,000 | 500 | 12-15% |
| Flue gas after the desulphurization and dust removal | <50 | <20 | 450 | 8-10% |
| Flue gas after the water-gas cooperative treatment | <50 | <10 | <50 | <8% |

| Index parameters of water | COD (mg/L) | $NH_4^+$—N (mg/L) | Soluble salts (mg/L) |
|---|---|---|---|
| Original wastewater | 1,000 | 500 | Calcium hardness >500<br>Total Fe >10<br>$Cu^{2+}$ >20<br>$Cl^-$ >1,000 |

TABLE 2-continued

Index parameters of the flue gas and
water in each step of Example 2.

| | | | |
|---|---|---|---|
| Wastewater after the carbon source separation | <100 | <500 | Calcium hardness >500<br>Total Fe >10<br>$Cu^{2+}$ >10<br>$Cl^-$ >1,000 |
| Wastewater after the water-gas cooperative treatment | <50 | <15 | Calcium hardness >500<br>Total Fe >10<br>$Cu^{2+}$ >10<br>$Cl^-$ >1,000 |
| Wastewater after the desalting treatment | <50 | <15 | Calcium hardness <200<br>Total Fe <2<br>$Cu^{2+}$ <0.1<br>$Cl^-$ <700 |
| Final discharged water | <50 | <12 | Calcium hardness <200<br>Total Fe <2<br>$Cu^{2+}$ <0.1<br>$Cl^-$ <700 |

It can be seen from the above examples that by using the system for cooperatively treating water and gas to reduce pollutants and carbon emission according to the present disclosure, $NO_X$ and $CO_2$ in flue gas and $NH_4^+$—N and organics in wastewater are simultaneously removed.

The above description is only preferred embodiment of the present disclosure. It should be noted that those skilled in the art could further make several improvements and modifications without departing from the principle of the present disclosure, and these improvements and modifications shall be interpreted as falling within the scope of the present disclosure.

What is claimed is:

1. A method for cooperatively treating water and gas, comprising the following steps:
   introducing flue gas into a flue gas pre-treatment unit, and subjecting the flue gas to a desulphurization and dust removal treatment to obtain a desulphurized and dust-removed flue gas, and introducing the desulphurized and dust-removed flue gas into a gas-water cooperative cleaning unit,
   introducing wastewater into a wastewater pre-treatment unit, and subjecting the wastewater to a carbon source separation, adjusting a pH value of the wastewater after the carbon source separation to 7.0-8.2 to obtain a carbon source-removed wastewater, and introducing the carbon source-removed wastewater into the gas-water cooperative cleaning unit, and subjecting the carbon source-removed wastewater to a gas-water cooperative treatment, to obtain a clean flue gas and a remaining water,
   introducing the remaining water into a remaining water treatment unit, and subjecting the remaining water to a desalting treatment to obtain a desalted water, and
   introducing the desalted water into a circulating cooling evaporation unit, subjecting the desalted water to a circulating cooling evaporation as a cooling water to obtain a residual water, and introducing the residual water into the wastewater pre-treatment unit.

2. The method of claim 1, wherein a volume flow ratio of the desulphurized and dust-removed flue gas introduced into the gas-water cooperative cleaning unit to the carbon source-removed wastewater introduced into the gas-water cooperative cleaning unit is in a range of 2:1 to 10:1.

3. The method of claim 1, wherein the desulphurized and dust-removed flue gas has a $SO_X$ concentration of not larger than 200 $mg/Nm^3$, and a dust concentration of not larger than 20 $mg/Nm^3$, and
   the carbon source-removed wastewater has an $NH_4^+$—N concentration of 30 mg/L to 500 mg/L, and a ratio value of chemical oxygen demand to the $NH_4^+$—N concentration is not greater than 1.

4. The method of claim 1, further comprising:
   before introducing into the gas-water cooperative cleaning unit, first introducing the desulphurized and dust-removed flue gas into a first heat recovery device, and recovering heat from the desulphurized and dust-removed flue gas to obtain a first recovered heat and a desulphurized and dust-removed flue gas after recovering heat, and
   before introducing into the gas-water cooperative cleaning unit, first introducing the carbon source-removed wastewater into a second heat recovery device, recovering heat from the carbon source-removed wastewater to obtain a second recovered heat and a carbon source-removed wastewater after recovering heat, and
   introducing the first recovered heat and second recovered heat into an energy recovery unit for an energy recovery.

5. The method of claim 1, wherein
   the outlet of the flue gas pre-treatment unit is connected to the gas-water cooperative cleaning unit through a first pipeline, wherein the first pipeline is provided with a first heat recovery device thereon, and the first heat recovery device is provided with a first heat outlet,
   the water outlet of the wastewater pre-treatment unit is connected to the water inlet of the gas-water cooperative cleaning unit through a second pipeline, wherein the second pipeline is provided with a second heat recovery device, and the second heat recovery device is provided with a second heat outlet, and
   the first heat outlet and the second heat outlet are connected to an energy recovery unit, respectively.

6. The method of claim 5, wherein the method further comprises the use of a clean energy generation unit, wherein
   the clean energy generation unit comprises a solar power generation device or a carbon-source hydrogen generation device, and the carbon-source hydrogen generation device has an inlet connecting to the carbon source outlet of the wastewater pre-treatment unit, wherein the carbon-source hydrogen generation device comprises an electrolytic hydrogen production device; and
   the clean energy generation unit is provided with an energy outlet, and the energy outlet is connected to an inlet of the energy recovery unit.

7. The method of claim 4, wherein the first heat recovery device is an air-source heat pump, and the second heat recovery device is a heat exchanger.

8. The method of claim 1, wherein the gas-water cooperative cleaning unit is an anammox reactor.

9. The method of claim 1, wherein the carbon source separation device is provided with a carbon source separation membrane.

* * * * *